J. H. WHITE & E. N. BARTHELEMY.
TRACK LAYING MACHINE.
APPLICATION FILED JAN. 26, 1911.

1,019,395.

Patented Mar. 5, 1912.
8 SHEETS—SHEET 2.

Fig. 2.

Witnesses.
Harry Opsahl.
A. H. Opsahl

Inventors,
John H. White
Edward N. Barthelemy
By their Attorneys,
Williamson Merchant J. H. WHITE & E. N. BARTHELEMY.
TRACK LAYING MACHINE.
APPLICATION FILED JAN. 26, 1911.

1,019,395.

Patented Mar. 5, 1912.
8 SHEETS—SHEET 4.

Witnesses.
Harry Opsahl.
A. H. Opsahl.

Inventors,
John H. White.
Edward N. Barthelemy.
By their Attorney
William Merchant J. H. WHITE & E. N. BARTHELEMY.
TRACK LAYING MACHINE.
APPLICATION FILED JAN. 26, 1911.

1,019,395.

Patented Mar. 5, 1912.

Witnesses.
Harry Opsahl.
A. H. Opsahl

Inventors.
John H White
Edward N Barthelemy
By their Attorneys
Williamson Merchant J. H. WHITE & E. N. BARTHELEMY.
TRACK LAYING MACHINE.
APPLICATION FILED JAN. 26, 1911.

1,019,395.

Patented Mar. 5, 1912.

Witnesses.
Harry Opsahl.
A. H. Opsahl.

Inventors.
John H. White.
Edward N. Barthelemy.
By their Attorneys
Williamson & Merchant

COLUMBIA PLANOGRAPH CO., WASHINGTON, D. C.

UNITED STATES PATENT OFFICE.

JOHN H. WHITE AND EDWARD N. BARTHELEMY, OF FOLEY, MINNESOTA, ASSIGNORS, BY DIRECT AND MESNE ASSIGNMENTS, OF TWO-THIRDS TO SAID BARTHELEMY AND ONE-THIRD TO CASIMIR J. GALARNEAULT, OF FOLEY, MINNESOTA.

TRACK-LAYING MACHINE.

1,019,395.  Specification of Letters Patent.  Patented Mar. 5, 1912.

Application filed January 26, 1911. Serial No. 604,735.

*To all whom it may concern:*

Be it known that we, JOHN H. WHITE and EDWARD N. BARTHELEMY, citizens of the United States, residing at Foley, in the county of Benton and State of Minnesota, have invented certain new and useful Improvements in Track-Laying Machines; and we do hereby declare the following to be a full, clear, and exact description of the invention, such as will enable others skilled in the art to which it appertains to make and use the same.

This invention has for its object to provide an improved track laying machine and is especially designed as an improvement on that type of track laying machine disclosed and broadly claimed in U. S. Letters Patent No. 931,166, issued of date, August 17, 1909, to John R. White.

Generally stated, the invention consists of the novel devices and combinations of devices hereinafter described and defined in the claims.

In the present machine, so-called, as well as in the machine of the said prior patent, all of the cars of the track laying train are provided with a tie tramway extending along one side thereof, and with a rail tramway extending along the other side thereof. As shown, the tie tramway is on the righthand side of the train and the rail tramway is on the lefthand side of the train. These tramways are built in sections carried by the cars, so that the cars can be properly coupled together. The driving connections for the rollers or movable carriers of the tramways are flexibly connected between the cars, so as to permit the train to travel or stand on a curve without interfering with the operating connections of the machine.

The front or advance car is designated as the "pioneer car" and this pioneer car is provided with a forwardly extended delivery frame that overlies the roadbed and is provided with mechanism of novel construction for delivering the ties transversely of the roadbed substantially in the positions in which they are to be laid. The pioneer car also carries a rail delivering crane of novel construction, by means of which the rails may be properly laid on the ties and abutted against previously laid rails.

In the accompanying drawings which illustrate the invention, like characters indicate like parts throughout the several views.

Referring to the drawings.

Figure 1:
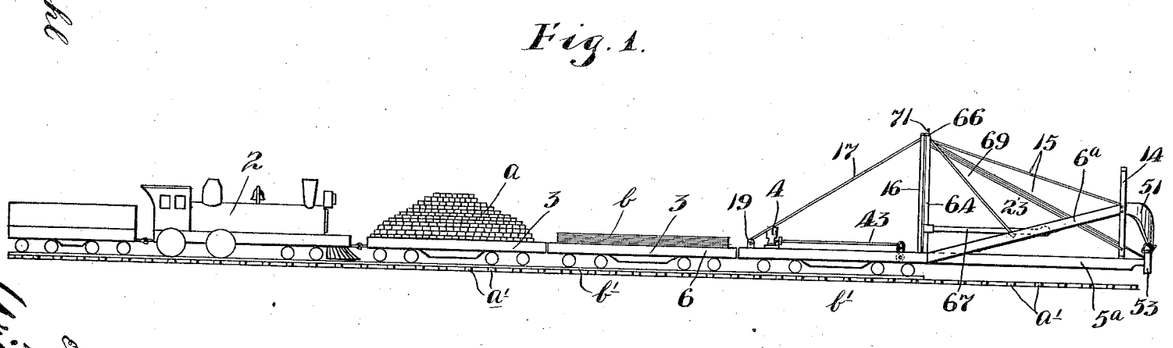
Figure 1 is a view in side elevation, chiefly in diagram, showing the track laying train.

Referring particularly to Fig. 1, but also to other views, the numeral 1 represents the so-called pioneer car, the numeral 2 the locomotive, and the numeral 3 the working cars, one of which is shown as loaded with ties $a$ and the other of which is shown as loaded with rails $b$.

In Fig. 1 a section of laid track is shown and therein the laid ties are indicated by the numeral $a^1$ and the laid rails by the numeral $b^1$. The cars and the engine of the train are coupled together in the usual way. On the pioneer car 1 is an engine 4 which may either be an explosive engine or steam engine, in which latter case the engine will be driven by steam supplied from the locomotive boiler through suitable connections not shown.

The numerals 5 and 6 represent, respectively, tramway frames for the rails and for the ties, the said frames being of the same length as the train elements to which they are attached. These frames, at their abutting ends, are preferably connected by hinged joints 7 having detachable pins, permitting the sections to be uncoupled. The tramway frames 5 and 6 of the pioneer car may be and preferably are rigidly or permanently applied thereto. At their ends, the tramway frames 5 and 6 of the working cars are preferably supported by block and tackle devices 8 attached at their lower ends to hanger yokes 9 and at their upper ends to hanger stakes 10. The said hanger yokes 9 are shown as attached to the respective frames 5 and 6, by hooks 11, and the stakes 10, at their lower ends, are detachably mounted in suitable stake pockets or seats formed therefor in suitable bearings on the several working cars, to-wit, on the pioneer car and on the working cars. As shown, the stakes 10 are provided with rigidly projecting arms 12 that engage the outer sides of the tramway frames 5 and 6 and hold the same against lateral outward swinging movements.

Figure 19:
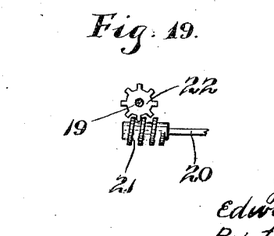
Fig. 19 is a detail in section taken on the line $x^{19}$ $x^{19}$ of Fig. 6.

The so-called rail and tie delivery frame, which is carried by the pioneer car and projects in front of the same, is made up chiefly of two main elements $5^a$ and $6^a$. The element $5^a$ is substantially a duplication of one of the tramway frames 5 for the delivery of rails, and the element $6^a$ is approximately a duplication of one of the tramway frames 6, for the delivery of the ties. These tramway frames $5^a$ and $6^a$ are connected to the front ends of the tramways 5 and 6 on the pioneer car, by flexible hinge joints 13, that permit limited swinging movements of the said elements $5^a$ and $6^a$, both laterally and vertically. The frame $5^a$ is approximately horizontal, while the frame $6^a$ rises toward its delivery end, as best shown in Fig. 3. The front ends of the said two frames $5^a$ and $6^a$ are tied together by an upright skeleton cross frame 14, shown in Figs. 1, 2, 3 and 12. It may be here stated that there will be sufficient spring to this tie frame 14 to permit the desired lateral swinging movements of the delivery ends of the frames $5^s$ and $6^a$, necessary to position the same properly over the roadbed in laying track on a curve. The upper side portions of the tie frame 14 is connected to the front ends of guy rods 15, the rear upper ends of which are attached to the upper end of a pedestal frame 16, the lower end of which is mounted on the front end of the pioneer car 1 in such manner that the said frame 16 may be oscillated slightly forward and rearward. The guy rods 15 support the delivery ends of the tramway frames $5^a$ and $6^a$, and the latter is held in the desired upright position and is adapted to be adjusted forwardly or rearwardly at its upward end, so as to slightly raise or lower the delivery ends of the said frames $5^a$ and $6^a$, by means of heavy cables or guy ropes 17. These cables 17, at their front ends, are attached to the upper end of the pedestal frame 16 and at their rear ends are secured to windlass drums 18 of a windlass shaft 19 mounted in suitable bearings on the rear portion of the pioneer car 1. As shown, the windlass drum 19 is arranged to be driven and held where set, by power supplied from the engine 4 through a countershaft 20 (see Figs. 5, 6 and 19), wherein a worm 21 on the extreme rear end of the said shaft 20 is engaged with a worm gear 22 on the said windlass shaft 19.

The lower portions of the sides of the tie frame 14 are connected to the front ends of a pair of transversely crossed straining cables 23 that are passed through suitable guides 24 (see Figs. 2 and 3), on the upper portion of the pedestal frame 16, and the lower ends of which are attached to and reversely wound upon a windlass shaft or drum 25 mounted in suitable bearings on the lower portion of the said frame 16. This windlass drum 25, at one end, (see Fig. 4) is provided with a worm gear 26 that is engaged by a worm 27 carried by a hand-operated crank 28 mounted in suitable bearings on the pedestal frame 16. The crossed cables 23 and drum 25 afford means for effecting the angular or lateral movements of the delivery ends of the tramway frames $5^a$ and $6^a$, it being obvious that when the drum 25 is rotated in either direction, one of the cables 23 will be wound thereon while the other will be unwound therefrom. The worm and gear 27—26 serve to lock the drum 25 and, hence, the delivery ends of the tramway frames $5^a$ and $6^a$ in any adjustment in which they may be set.

Each of the rail conveying tramway frames 5—$5^a$ is provided with a multiplicity of rail carrying rollers 29, and each of the tie carrying tramway frames 6—$6^a$ is provided with a multiplicity of sprocket equipped shafts 30, the sprockets of which are arranged in laterally spaced pairs and over which latter tie carrying sprocket chains 31 are arranged to run. At suitable intervals, the links of the coöperating laterally spaced pairs of chains 31 are connected by tie straps 32 (see particularly Figs. 1, 2 and 3). The sprocket-equipped shafts 30 and the shafts of the rollers 29, at their outer ends, are provided with miter gears 33 that mesh with miter gears 34 carried by driving shafts 35. The shafts 35 are mounted in suitable bearings on the coöperating tramway frames 5—5ª and 6—6ª and at the joints between the said frames, they are detachably connected by slightly extensible knuckle joint connections 36.

Figure 2:
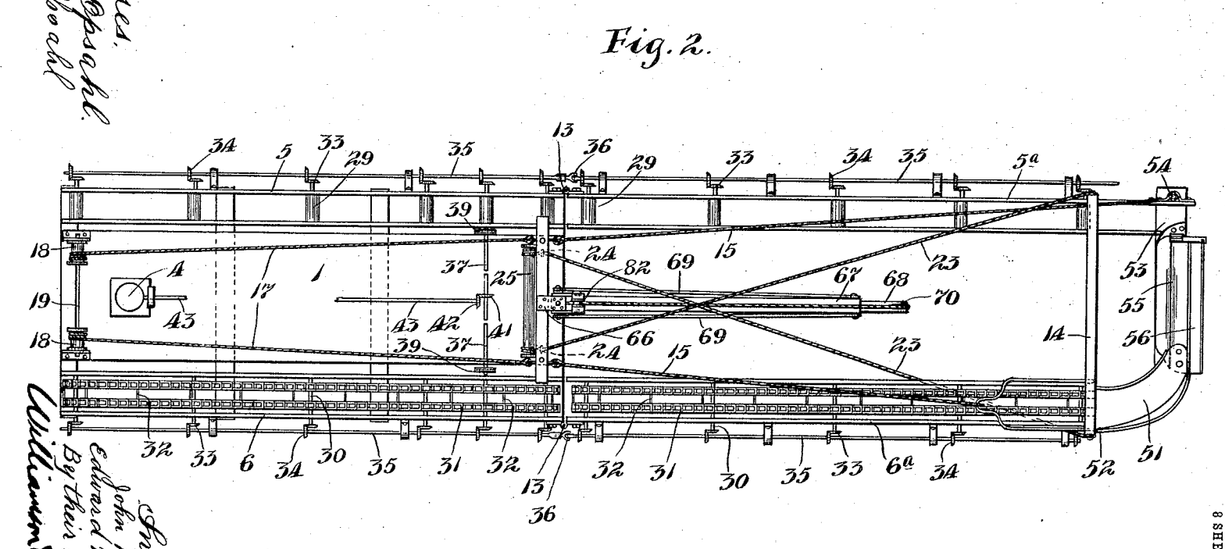
Fig. 2 is a plan view of the pioneer car and mechanism carried thereby, some parts being removed.
Figures 3, 4:
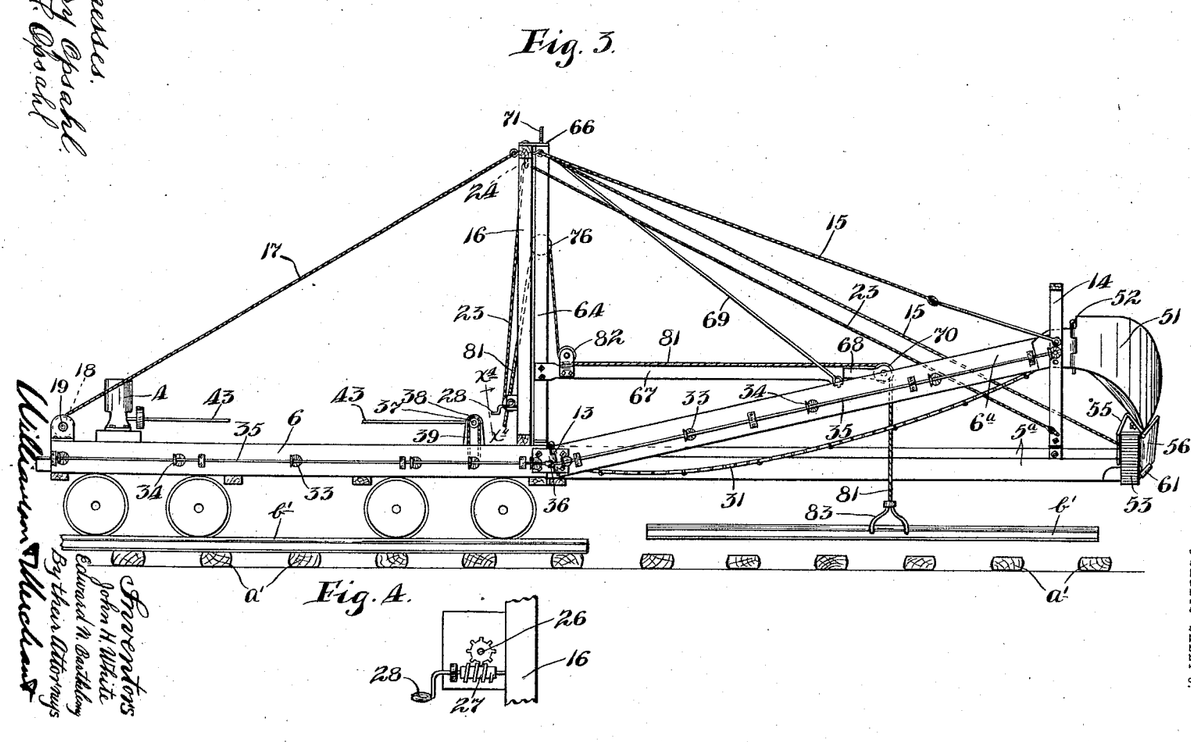
Fig. 3 is a right side elevation of the pioneer car and mechanism carried thereby, some parts being removed.
Fig. 4 is a detail view in rear elevation, showing parts in the vicinity of the line marked $x^4$ $x^4$ of Fig. 3.
Figure 5:
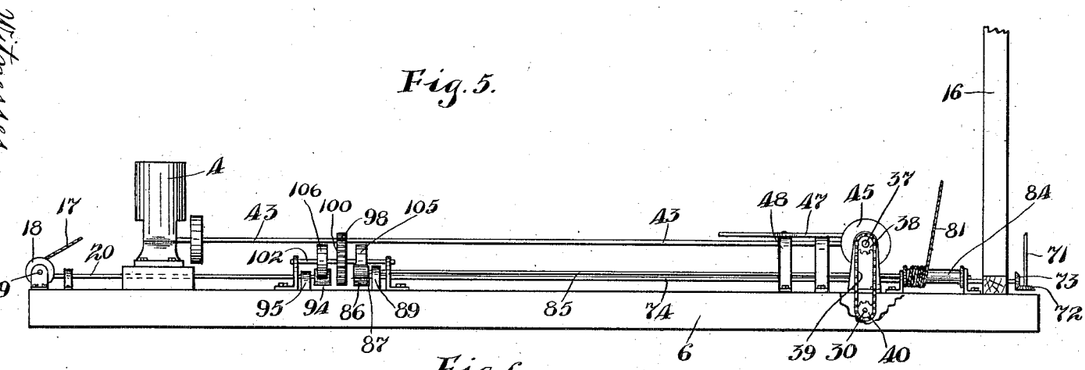
Fig. 5 is a side elevation, with some parts broken away and some parts removed, showing the frame of the pioneer car and illustrating, particularly, certain parts removed from Figs. 1, 2 and 3, in order to avoid confusion in the multiplicity of parts.
Figure 6:
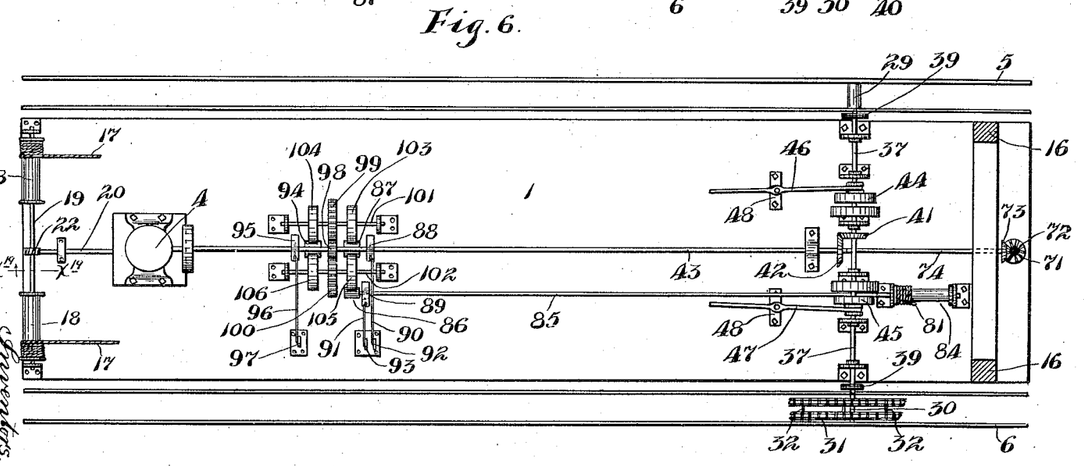
Fig. 6 is a plan view of the parts shown in Fig. 5, some parts being broken away and some parts being sectioned.

Mounted in suitable bearings on the front portion of the pioneer car 1 is a transverse countershaft 37, which at its ends carries sprockets 38 (see Figs. 2, 5 and 6). Sprocket chains 39 run over the sprockets 38 and over lower sprockets 40 secured one to the inwardly projected end of one of the sprocket equipped shafts 30 and the other to the inwardly projected end of the shaft of one of the rollers 29. At its intermediate portion, the countershaft 37 carries a miter gear 41 that meshes with a miter gear 42 on the front end of a long longitudinally extended main driving shaft 43 mounted in suitable bearings on the car 1 and which, as shown, is connected at its rear end to the crank shaft of the engine 4.

The countershaft 37 is made in three sections, to-wit, an intermediate section and end sections, and its end sections are adapted to be connected to its intermediate section, at will, preferably by friction clutches 44 and 45 operated, respectively, by shorter levers 46 and 47 (see particularly Fig. 6). With these connections, when the engine is in action, the rail delivering rollers 27 may be thrown into action at will, by manipulation of the clutch 44 through the lever 46, and the tie delivering chains may be thrown into action at will by manipulation of the clutch 45 through the lever 47. The levers 47 are shown as pivoted to supports 48 on the pioneer car 1.

Figures 16, 17, 18:
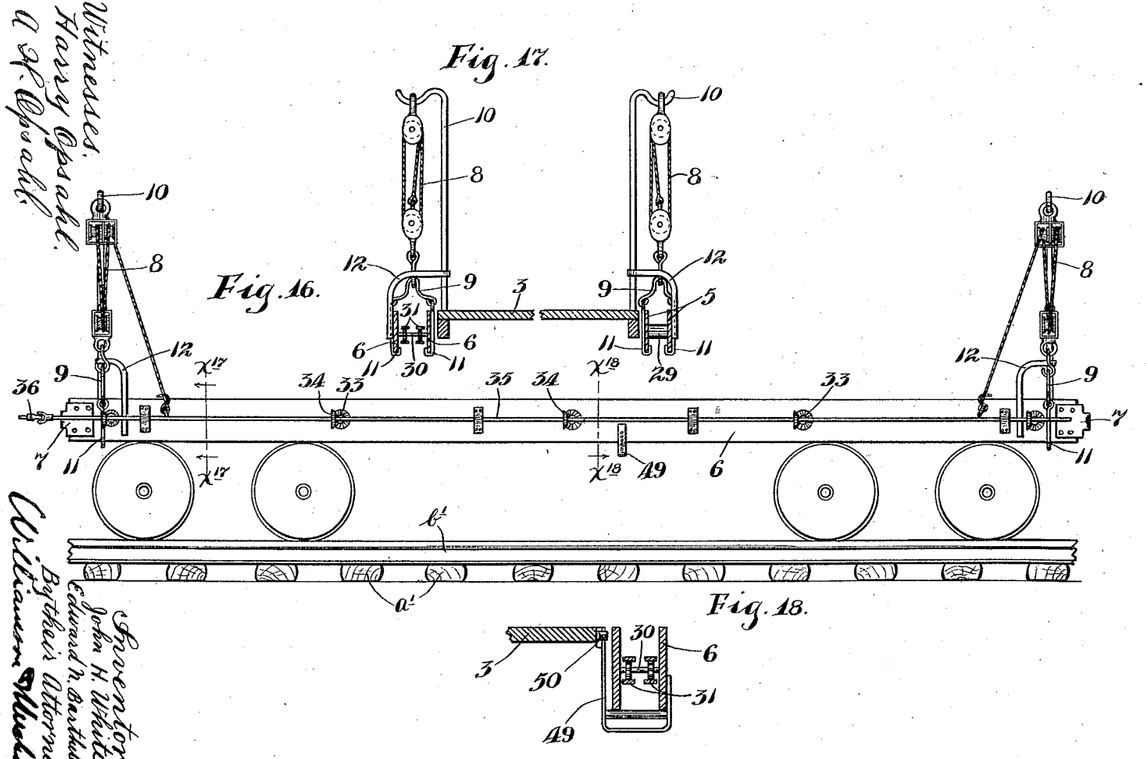
Fig. 16 is a side elevation showing one of the so-called working cars.
Fig. 17 is a transverse section taken on the line $x^{17}$ $x^{17}$ of Fig. 16.
Fig. 18 is a detail in section on the line $x^{18}$ $x^{18}$ of Fig. 16.

Fig. 18 illustrates a device which may be detachably applied to the intermediate portions of the sides of the working cars 3, to prevent sagging of the intermediate portions of the tramway frames 5 and 6. This device, as shown, comprises a U-shaped bracket 49, one arm of which is detachably connected at 50 to the side of the car. This bracket 50 may be readily removed whenever it is desired to drop down or remove either of the tramway frames 5 or 6.

The ties carried to the elevated delivery end of the tramway frame 6ª are discharged therefrom and deposited on the roadbed transversely thereof approximately in position for the application of the rails thereto, by means of a so-called tie dropper of novel construction. This improved tie dropper is in the form of an inclined discharge spout 51 (see particularly Figs. 1, 2, 3, and 12 to 14, inclusive), and at its upper end it is connected to the upper end of the tramway frame 6ª by a hinged joint 52, and at its lower end it is provided with an extended bottom board 53 that is pivotally connected by a bolt 54 to an extended end portion of the tramway frame 5ª (see particularly Fig. 12). The delivery portion of the tie dropper is inclined in a vertical plane extending at a right angle to the track, and this portion, as preferably constructed, is made up of the said bottom board 53, of an inverted V-shaped body portion 55 secured to the latter, and a drop bottom or door 56 connected to the adjacent edge of the bottom board 53 by a hinge 57. The said parts 55 and 56 normally form a V-shaped trough into which the ties, one after another, will be delivered by the curved upper portion 51 of the tie dropper.

To the extreme lower end of the relatively fixed body section 55, a tripping end plate 58 is connected by a hinge 59. A spring 60, preferably applied to the hinge 59, normally holds the tripping end plate 58 against the lower end of the drop bottom 56, and the latter is normally held in its upturned position between a cam lug 61 and a stop pin 62 on the said tripping plate 58. The so-called drop bottom 56 will be automatically thrown upward to its operative position by springs 63 (see Fig. 12), and when it is thus thrown upward, it will engage the cam lug 61 and automatically reëngage therewith. The normal position of the parts just described is indicated by full lines in the drawings and attention is particularly called to Figs. 12 and 13. When a tie is delivered into the inclined trough of the dropper, it will be held in the inclined trough until its end strikes the tripping plate 58, whereupon the latter will be moved downward against the tension of the spring 63, approximately into the position indicated by dotted lines in Fig. 13 and the tie will be dropped from the trough onto the roadbed. It will thus be seen that the automatically tripped trough of the tie dropper will be held in form until the tie has been delivered to the very lower end thereof, whereupon the said trough will collapse or open up and drop the tie.

Usually, the train will be slowly moved while the ties are dropped one after another in number sufficient to support a rail length and then the train will be temporarily stopped while the rails are being positioned and laid on the ties.

For taking the rails off from the rollers of the tramway frame 5ª and properly positioning the same on the ties, there is provided a crane of novel construction. This improved crane comprises a hollow mast 64 which, at its lower end, is mounted on a bearing 65 on the front portion of the pioneer car with freedom for oscillatory movements of the top of the mast longitudinally of the train. The upper end of the mast (see Fig. 3) is pivotally attached to a bearing plate 65 on the upper end of the pedestal frame 16. The mast 64 is, therefore, also capable of oscillatory movements on its vertical axis. Its boom is made up of telescopically extensible sections 67 and 68, the former of which is rigidly secured to the mast 64. The free end of the boom section 67 is connected to the top of the machine by one or more guy rods 69. The extensible mast section 68, at its free end, is bifurcated and carries a cable guiding sheave 70. A shaft 71 extends axially through the mast 64 and is journaled therein but held against endwise movements in respect thereto. At its lower end, the shaft 71 is provided with a bevel pinion 72 that meshes with a bevel gear 73 carried by the front end of a shaft 74 mounted in suitable bearings on the pioneer car. The upper portion of the shaft 71 is screw-threaded and has engagement with a follower 75 that works within the mast and carries a slack compensating sheave 76.

A screw shaft 77 extends axially through the boom section 67, is held against endwise movements in respect to the latter, and has threaded engagement with a nut block 78 formed on the inner end of the extensible boom section 68. At its rear end the shaft 77 is provided with a bevel gear 79 that meshes with a bevel pinion 80 carried by the upright shaft 71. A rail lifting cable 81 runs over the sheaves 70 and 76 and under an intermediate sheave 82 mounted in suitable bearings on the inner end portion of the relatively fixed boom section 67. At its front end, the cable 81 is provided with a rail grapple 83 (see Fig. 3), and at its rear end it is attached to and wound upon a windlass drum 84 mounted in suitable bearings on the pioneer car and having a shaft 85 that extends longitudinally of the same car and is provided at its rear end with a friction wheel 86 (see Figs. 5, 6 and 7). The bevel gear 79 is assumed to have twice the diameter of the coöperating pinion 80 and the threads on the shafts 71 and 77 are assumed to be the same number per inch. With this arrangement, if the drum attached end of the rail lifting cable 51 be held stationary and the screw shafts 71 and 77 rotated, the extensible boom section 68 will be moved either outward or inward, according to the direction of the rotation of the said shafts, and the follower 75 and its sheave 76 will be moved vertically at just one-half the rate of speed of the movement of the said boom section 68. Also, the arrangement is such that when the boom 68 is moved outward, the said sheave 76 will be lowered, and when the said boom 68 is moved inward, the sheave 76 will be raised.

It, therefore, follows that since the cable 81 is doubled in that portion which is passed over the sheave 76, the movements just described, to-wit, the movements of extending or contracting the boom will neither raise nor lower a rail suspended by the grapple 83, but will maintain the same at the same elevation under all adjustments of the said boom, unless, of course, at the same time, the cable 81 be given movement from its holding drum 84. Otherwise stated, the rail lifting or lowering movements of the cable 81 imparted by manipulations of the drum 84 and adjustments of the boom of the crane, whether at the same or different times, do not, in any way, interfere with or change the elevation of the rail held in suspension by the crane.

The importance of making the boom of the crane extensible and of combining therewith the compensating device for preventing such movements from raising and lowering the rails, is thought to be apparent. It may, however, be further added that, by adjustments of the boom, rails may be moved endwise without moving the pioneer car and thereby brought with their ends abutting against previously laid rails regardless of the exact position of the pioneer car in respect to the laid rails. Also, when the cable 81 has been once adjusted so as to support a rail in proper position to be butted against the laid rails, it would be very annoying and inconvenient if this vertical adjustment should be changed every time a rail was moved endwise by adjustments of the boom. These objectionable features obviously are eliminated by the improved crane above described.

The shaft 74, which as already described operates the crane boom and the compensating device thereof, is provided at its extreme rear end with a friction wheel 87 which extends opposite to the friction wheel 86 of the shaft 85. Said shaft 74 adjacent to its friction wheel 87 is journaled in a sliding bearing 88, while the shaft 85 adjacent to its friction wheel 86 is journaled in a similar sliding bearing 89. The sliding bearings 88 and 89 are connected by rods 90 and 91, respectively, to operating levers 92 and 93 on the pioneer car 1 (see particularly Figs. 7 and 8).

The shaft 20, which as described operates the windlass drums 18, is provided at its front end with a friction wheel 94 and adjacent to said friction wheel, it is journaled in a sliding bearing 95. The bearing 95 is connected by a rod 96 to an operating lever 97 mounted on the pioneer car.

Figure 7:
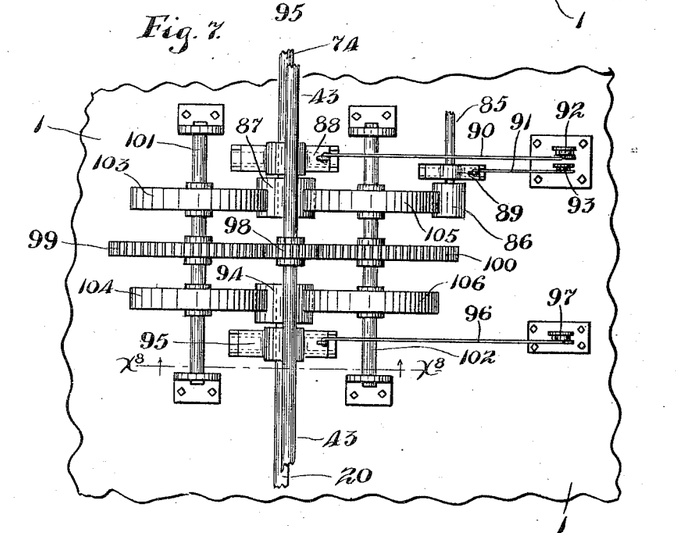
Fig. 7 is a fragmentary view showing in plan and on a larger scale than in Figs. 5 and 6, the driving and controlling mechanism for the various engine driven operating shafts.
Figure 8:
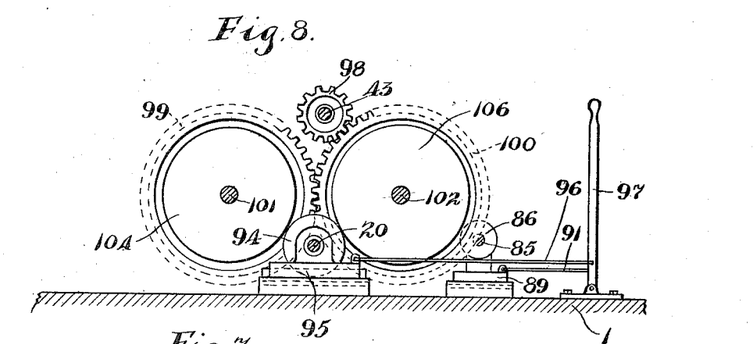
Fig. 8 is a transverse section taken approximately on the line $x^8$ $x^8$ of Fig. 7.
Figures 9, 10, 11:
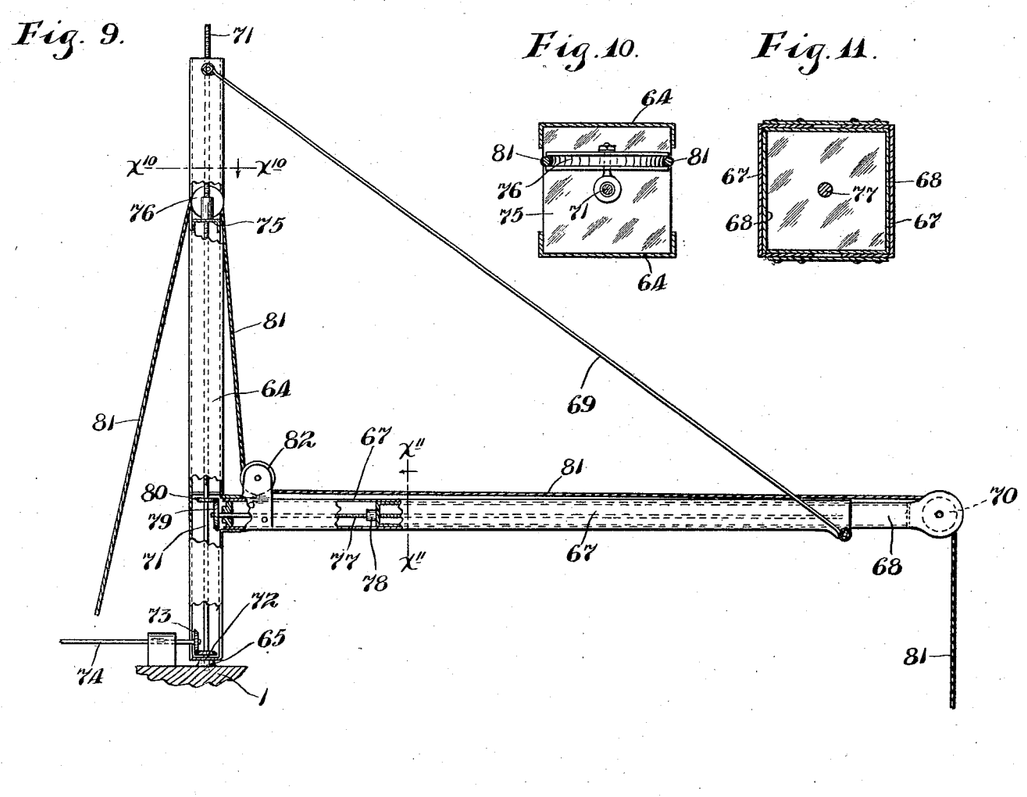
Fig. 9 is a view in side elevation, with some parts broken away and some parts in section, showing, in detail, the construction of the rail delivering crane.
Figs. 10 and 11 are enlarged sections taken, respectively, on the lines $x^{10}$ $x^{10}$ and $x^{11}$ $x^{11}$ of Fig. 9.
Figure 12:
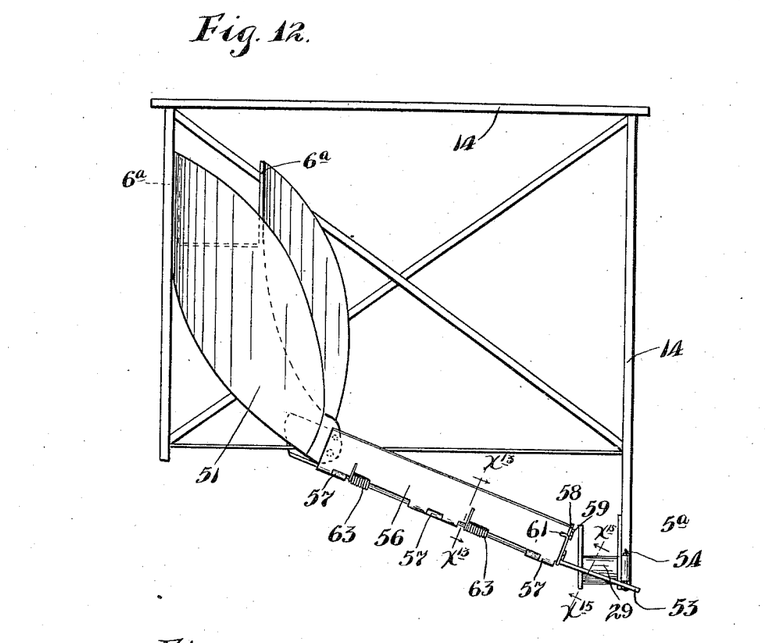
Fig. 12 is a front end elevation showing the automatic tie discharging device.
Figures 13, 14, 15:
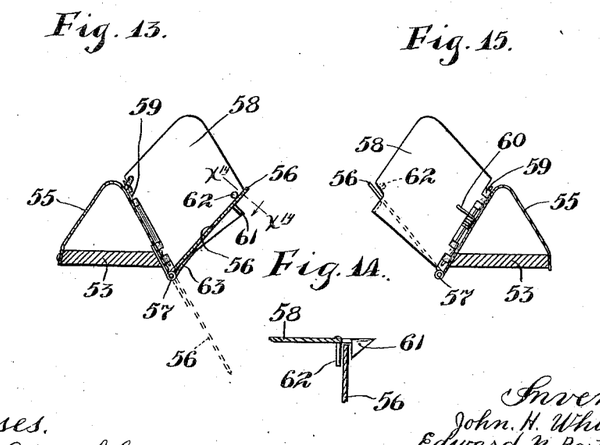
Fig. 13 is an enlarged transverse section taken on the line $x^{13}$ $x^{13}$ of Fig. 12.
Fig. 14 is a detail in section on the line $x^{14}$ $x^{14}$ of Fig. 13.
Fig. 15 is a section taken on the line $x^{15}$ $x^{15}$ of Fig. 12.

For coöperation with the friction wheels 86, 87 and 94, transmission mechanism, shown in detail in Figs. 6, 7 and 8, is provided. The engine driven shaft 43 carries a spur pinion 98 that meshes with spur gears 99 and 100 carried, respectively, by countershafts 101 and 102 journaled in suitable bearings on the pioneer car. The countershaft 101 carries friction wheels 103 and 104 and the countershaft 102 carries friction wheels 105 and 106. As is evident, the countershafts 101 and 102 are, from the shaft 43, driven in reverse directions. By manipulations of the levers 92, the friction wheel 87 may be thrown into engagement with either of the reversely driven friction wheels 103—105 and thus the shaft 74 may be rotated in either direction at will, so as to cause the boom of the rail operating crane to be lengthened or shortened as desired. By manipulation of the lever 93, the friction wheel 86 may be engaged at will with the friction wheel 105, so as to control the movements of the rail lifting cable 81. By manipulations of the lever 97, the friction wheel 94 may be engaged at will with either of the reversely moving friction wheels 104—106, to thereby rotate the shaft 20 in either direction at will, so as to thereby adjust the so-called pedestal frame 16 and, hence, the delivery ends of the tramway frames 5ª and 6ª. The vertical adjustments of the delivery ends of the said tramway frames 5ª and 6ª are desirable in order to keep the same always at the proper elevation even when the pioneer car is on rough or irregular track.

The manner in which the ties have been delivered onto the road bed transversely of the track and ahead of the previously laid rails has been fully described. The rails, as is obvious, will be delivered onto the rollers of the extended tramway frame 5ª, and from thence, the rails may be quickly and easily picked up and properly positioned on the laid ties by the use of the improved crane 64—67 and its lifting cable 81, the latter of which is provided with a rail grapple 83, already described, for engagement with the rails.

By reference, particularly to Fig. 3, it would seem that without moving the pioneer car, the rail suspended by the cable of the crane may be given considerable endwise movement such as necessary to cause the end thereof to abut against the end of a previously laid rail.

What we claim is:

1. The combination with a car, of posts applied to the sides thereof and provided with outwardly extended vertically movable depending arms, of tramways detachably supported between the bodies and arms of said posts, substantially as described.

2. The combination with a car, of posts applied to the sides thereof and provided with outwardly extended, vertically movable depending arms, block and tackle devices anchored to the upper portions of said posts, and tramways detachably supported by said block and tackle devices and normally positioned between the body and the arms of said posts, substantially as described.

3. In an apparatus of the kind described, a pioneer car provided with a tramway at one side thereof for the delivery of ties and having a tramway extension extended upward from said tramway and in front of said car, and an automatic tie discharger in the form of an inclined curved discharge trough, substantially as described.

4. The combination with a pioneer car having an extended tramway for the delivery of ties, of an automatic tie discharger at the delivery end of said tramway in the form of a curved and inclined trough.

5. The combination with a pioneer car having an extended tramway for the delivery of ties, of a tie discharger at the delivery end of said tramway in the form of a curved and inclined trough, the said trough having a hinged side movable to drop the ties, substantially as described.

6. The combination with a pioneer car having an extended tramway for the delivery of ties, of a tie discharger at the delivery end of said tramway, in the form of a curved and inclined trough, the said trough having a hinged side, a lock for the latter and a trip for said lock, which trip is actuated by the engagement therewith of the tie to be dropped.

7. The combination with a pioneer car having an extended tie delivery tramway, of a tie discharger receiving the ties from the said extended tramway and comprising an inclined trough having a hinged tie dropping member, a lock for the latter, and a trip for said lock, which trip is actuated by the engagement therewith of the tie to be dropped.

8. The combination with a pioneer car having an approximately horizontal rail delivery tramway, and an upwardly extended tie delivery tramway, which tramways project from the front end of said car, of an inclined tie delivery trough receiving ties from said tie delivery tramway, for the delivery of said ties on the road bed said trough having transversely inclined sides.

9. The combination with a pioneer car having an approximately horizontal rail delivery tramway, and an upwardly extended tie delivery tramway, which tramways project from the front end of said car, of an inclined tie delivery trough receiving ties from said tie delivery tramway, for the delivery of said ties on the road bed, and means for adjusting laterally the extended delivery end portions of said two tramways, substantially as described.

10. The combination with a pioneer car having an approximately horizontal rail delivery tramway, and an upwardly extended tie delivery tramway, which tramways project from the front end of said car, of an inclined tie delivery trough receiving ties from said tie delivery tramway, for the delivery of said ties on the road bed, and means for adjusting vertically the delivery end portions of said two tramways.

11. The combination with a pioneer car having an approximately horizontal rail delivery tramway, and an upwardly extended tie delivery tramway, which tramways project from the front end of said car, of an inclined tie delivery trough receiving ties from said tie delivery tramway, for the delivery of said ties on the road bed, and means for adjusting both vertically and laterally, the delivery end portions of said tramways.

12. The combination with a pioneer car having an approximately horizontal rail delivery tramway, and an upwardly extended tie delivery tramway, which tramways project from the front end of said car, of an inclined tie delivery trough receiving ties from said tie delivery tramway, for the delivery of said ties on the road bed, a tie frame connecting the delivery end portions of said two tramways, and means for laterally adjusting the delivery end portions of the said two tramways.

In testimony whereof we affix our signatures in presence of two witnesses.

JOHN H. WHITE.
EDWARD N. BARTHELEMY.

Witnesses:
BERNICE G. WHEELER,
HARRY D. KILGORE.

Copies of this patent may be obtained for five cents each, by addressing the "Commissioner of Patents, Washington, D. C."